United States Patent [19]

Willis

[11] 4,245,815
[45] Jan. 20, 1981

[54] PROPORTIONAL SOLENOID VALVE AND CONNECTOR

[75] Inventor: John G. Willis, Chelmsford, Mass.

[73] Assignee: Linear Dynamics, Inc., East Pepperell, Mass.

[21] Appl. No.: 14,650

[22] Filed: Feb. 23, 1979

[51] Int. Cl.³ .............................................. F16K 31/06
[52] U.S. Cl. ..................................... 251/129; 251/141
[58] Field of Search ........................ 251/141, 129, 139

[56] References Cited

U.S. PATENT DOCUMENTS

| 3,684,238 | 8/1972 | Michellone et al. ................. 251/129 |
| 4,108,420 | 8/1978 | West et al. ......................... 251/141 X |

FOREIGN PATENT DOCUMENTS

1279668   France ..................................... 251/129

Primary Examiner—Arnold Rosenthal

[57] ABSTRACT

A solenoid controlled proportional flow valve comprises an operating solenoid having an axially extending coil, and a valve body having an axially extending cavity with a fluid inlet passage, a fluid outlet passage and a valve seat surrounding one of the passages on one end wall of the cavity. A valve plunger is axially movable within the cavity for movement of one end wall thereof toward and away from the valve seat. Biasing means is interposed between the opposite ends of the cavity and plunger, the biasing means including a generally conical abutment having a rounded free end preloaded in contact with a resilient deformable elastomeric spring having a diameter at all times greater than the portion of said conical abutment member in contact therewith. The biasing means normally maintains the valve plunger in contact with the valve seat, and the solenoid moves the plunger away from the valve seat in proportion to the flow of current therethrough.

A connector permits the valve (as well as other valves of variant design) to be connected to a printed circuit board, with all pneumatic and electrical connections to the valve on the side of the board remote from the valve.

4 Claims, 9 Drawing Figures

PROPORTIONAL SOLENOID VALVE AND CONNECTOR

This invention relates to valves. In particular, it relates to a solenoid operated proportional pneumatic valve, suitable for use in connection with microprocessors or other logic circuitry, and to a connector for such valve.

In a conventional solenoid operated valve, a plunger of magnetic material is slidable within a solenoid; a spring or other biasing means urges the plunger into contact with a valve seat. When no current is supplied to the solenoid, the valve is maintained closed by the spring. When current flows in the solenoid, a magnetic force acts against the spring to move the plunger away from the valve seat. When the magnetic force exceeds the force of the spring, the plunger is moved out of contact with the valve seat into a remote position in which the valve is fully open. Such a valve has essentially only two conditions, open and closed.

A proportional valve is one in which the flow of fluid varies in proportion to the current in the solenoid. Such a valve is desirable for many applications in which a gradual variation in flow is preferable to an abrupt change between on and off conditions. For example, a proportional valve of the type disclosed herein is particularly suited for use with a sphygmomanometer (an instrument for measuring blood pressure).

Many designs have been proposed for proportional valves. Most such designs are extremely complex, requiring a large number of components, which means that such valves are expensive to manufacture and assemble, and tend to be unreliable in use. Many engineering applications in which a proportional valve might advantageously be employed have not made use of such valves because of the expense. In addition, it has not hitherto been found practicable to make proportional valves in the small sizes and with the low power requirements that are adapted for use in interfacing with computers and similar circuitry. When larger and more complex valves have been used, additional interfacing structure or circuitry has been required, adding to the expense.

The valve of the present invention provides a variable fluid flow that is proportional to the current supplied to the solenoid. The valve is simple in design, and comprises relatively few components of simple structure. The valve is, as a result, inexpensive to manufacture and reliable in operation, and can be employed in many applications in which proportional valves have not hitherto been used. In particular, the valve of this invention is especially adapted for use in connection with microprocessors or other logic devices, since interface and application circuitry are no longer required.

The connector of the invention permits the valve of the invention (as well as other valves of variant design, such as three-port valves) to be simply and easily connected to a printed circuit board, as part of the circuitry directly controlled by a microprocessor or the like.

According to the invention, a solenoid controlled proportional flow valve comprises an operating solenoid having an axially extending coil, and a valve body having an axially extending cavity with a fluid inlet passage, a fluid outlet passage and a valve seat surrounding one of the passages on one end wall of the cavity. A valve plunger is axially movable within the cavity for movement of one end wall thereof toward and away from the valve seat. Biasing means is interposed between the opposite ends of the cavity and plunger, the biasing means including a generally conical abutment having a rounded free end preloaded in contact with a resilient deformable elastomeric spring having a diameter at all times greater than the portion of the conical abutment member in contact therewith. The biasing means normally maintains the valve plunger in contact with the valve seat, and the solenoid moves the plunger away from the valve seat in proportion to the flow of current therethrough.

In preferred embodiments, the valve comprises a valve-operating solenoid having a generally cylindrical axially extending core, and an axially extending coil wound on the core, the core defining an axially extending internal passage. The valve further comprises a valving portion providing a valve chamber communicating with the internal passage, a fluid inlet passage and a fluid outlet passage communicating with the valve chamber, and a valve seat surrounding one of the passages on one wall of the valve chamber. The internal passage and valve chamber together define an axially extending cavity. A valve plunger is axially movable within the cavity for movement of one end wall thereof toward and away from the valve seat. The biasing means comprises proportional travel control means and valve closure biasing means.

The valve closure biasing means comprises a spring interposed between the plunger and the wall of the valve chamber opposite the one wall, the valve closure biasing means normally maintaining the valve plunger in contact with the valve seat. The proportional travel control means comprises a resilient deformable elastomeric member carried at the end of the valve plunger remote from the valve seat; a generally conical abutment disposed within the axially extending internal passage and extending toward the elastomeric member, the abutment having a rounded free end, and having a greatest diameter smaller than the diameter of the elastomeric member; and adjustment means for positioning the abutment axially within said passage to preload the abutment into contact with the elastomeric member in the closed condition of the valve. The plunger is thereby moved away from the valve seat through a distance proportional to the flow of current through the solenoid.

The valve connector of the invention is adapted for use with a valve having at least two fluid ports, such as the valve of the invention, the valve having an electrical portion providing two electrical connections, and a forward valving portion providing two fluid ports. The connector comprises a connector body of electrically non-conductive material, having a generally flat lower surface, the connector body comprising a forward portion having a valving portion receiving upper surface, and a median portion having an electrical portion receiving upper surface.

The connector body forward portion provides two fluid port receiving apertures and two pneumatic barbs carried on the connector body lower surface, a pneumatic barb being in communication with a fluid port receiving aperture. The connector body median portion provides two electrical connection receiving apertures providing electrically conductive structure, and two electrical pins carried on the connector body lower surface, an electrical connection receiving aperture conductive structure being electrically connected to a pin.

The connector body further comprises an upright portion remote from the forward portion and providing a fluid port receiving recess, an internal passage in communication therewith, and a pneumatic barb in communication with the passage carried on the connector flat lower surface.

Other objects, features and advantages will appear from the following description of a preferred embodiment of the invention, taken together with the drawing, in which.

Figure 1:
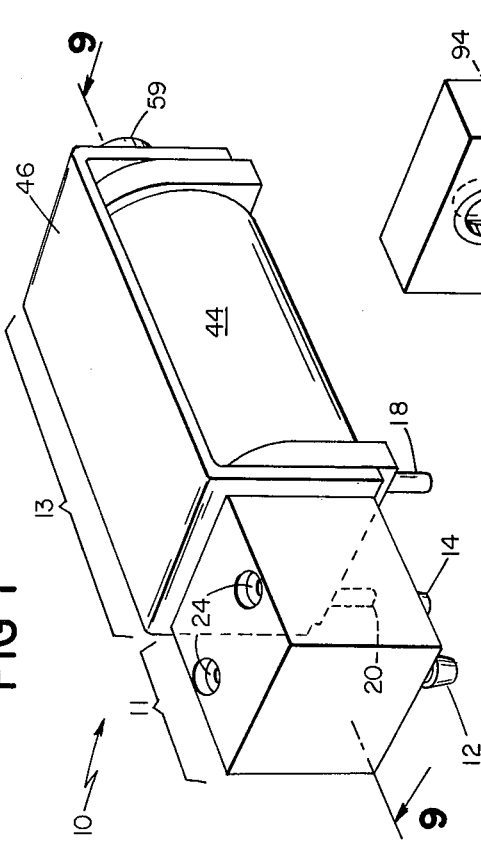
FIG. 1 is a view of the exterior of the valve of the invention.

Referring now to the drawing, and in particular to FIG. 1, the valve 10 of the invention comprises generally a forward valving portion 11 providing a fluid input port 12 and a fluid output port 14, and an electrical or valve-operating portion 13 with electrical connections 18 and 20. Forward portion 11 provides two screw holes 24, whose function will be described in connection with the valve connector of FIG. 2.

Figure 9:
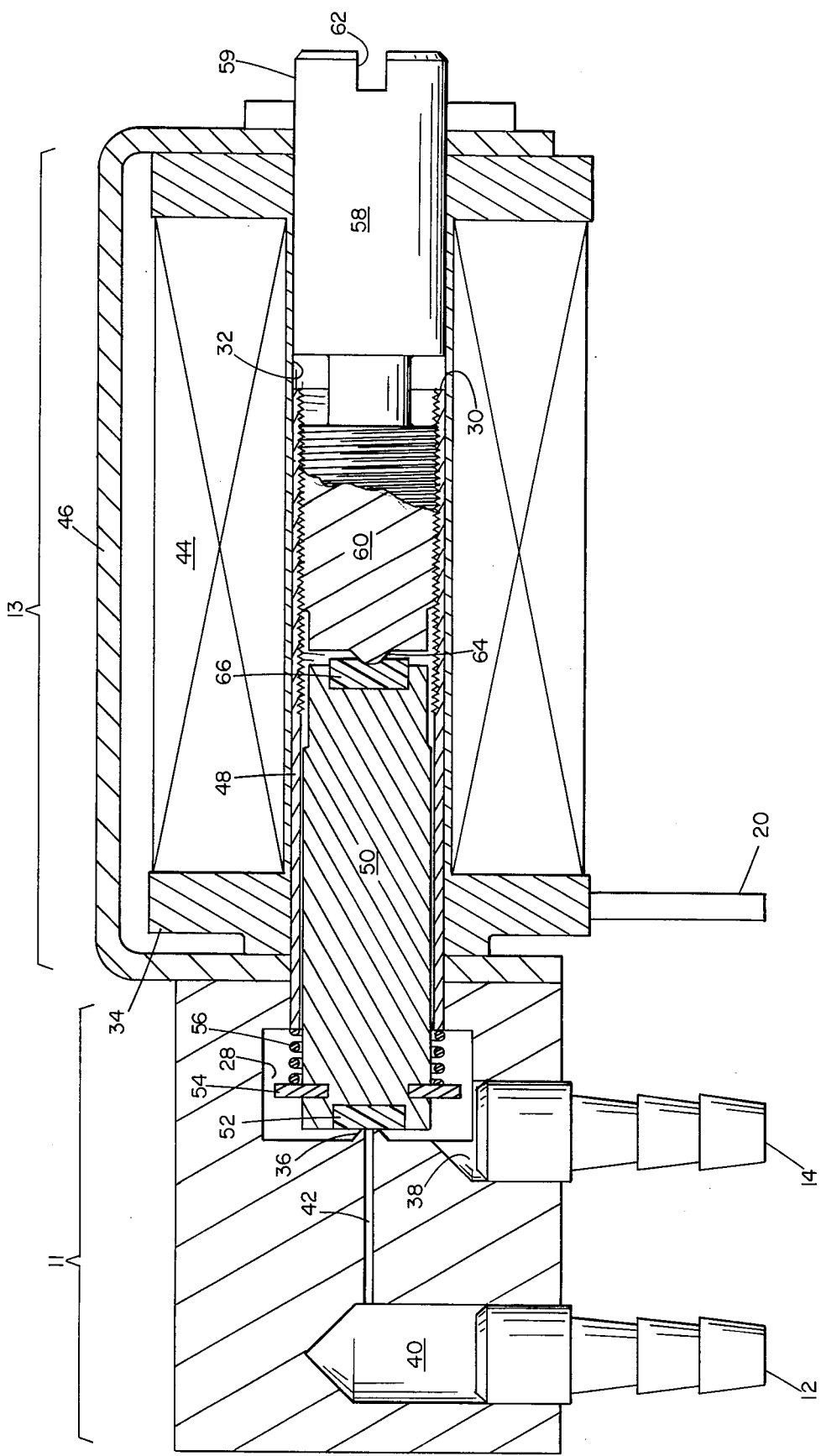
FIG. 9 is a cross-sectional view of the valve taken on the lines 9—9 of FIG. 1.

The interior of valve 10 is seen in cross-section in FIG. 9. The forward portion 11 of the valve, of generally conventional design, is secured to the electrical portion of the valve. Valve forward portion 11 provides an internal valve chamber 28. A first internal passage 38 within forward portion 11, connected to output port 14, communicates with chamber 28. A second internal passage 40, connected to input port 12, communicates with a narrow passage 42. Passage 42 communicates with internal chamber 28 through a tapered valve seat 36.

The electrical portion 13 of valve 10 comprises a solenoid coil 44 wound on a core 34 of generally annular form. A flux conductor 46 is provided exterior to the coil.

Core 34 defines an internal passage 32 extending axially through the electrical portion 13 of valve 10 and communicating with internal valve chamber 28. Chamber 38 and passage 32 together form an axially extending cavity in valve 10. A tube 48 extends from internal chamber 28 through a major portion of axial passage 32, fitting closely therein, and provides an annular stop surface 30 at the end remote from valve forward portion 11. The portion of the interior surface of tube 48 adjacent stop surface 30 is threaded.

A generally cylindrical plunger 50 of magnetic material fits within the unthreaded portion of tube 48 with a small clearance, and is slidable therein. The forward end wall of plunger 50, adjacent valve seat 36, provides a centrally located generally disk shaped inset 52, made of Buna "N" elastomer. Any similar elastomer may be used, the criteria for selection of such an elastomer being known in the art. At the forward end of plunger 50, slightly to the rear of elastomer inset 52, a snap ring spring retainer 54 is provided. A compression spring 56 is confined between the forward end of tube 48 and spring retainer 54; spring 56 acts as a valve closure biasing means and biases plunger 50 forward toward valve seat 36.

An adjustable stop member 58 within axial passage 32 includes an externally threaded portion 60, which cooperates with the internally threaded portion of tube 48 to define an axially adjustable position of stop member 58 within the passage. Stop surface 30 of tube 48 defines the limit of inward adjustment of member 58. The rearward portion 59 of stop member 58 fits closely within core 34 and forms a fluid seal therewith. The remote end of rearward portion 59 provides a slot 62 which permits the stop member to be adjusted with a screwdriver.

The threaded portion 60 of stop member 58 provides, at its inward end, a generally conical abutment 64, having a rounded free end. The abutment extends about 0.015 inch beyond the plane surface from which it rises, and at its base is about 0.040 inch in diameter, tapering to about 0.030 inch at its tip. The adjacent end of plunger 50 provides a centrally located generally cylindrical inset 66, about 3/32 inch in diameter and 1/16 inch in thickness, of Buna "N" elastomer. Other suitable resiliently deformable elastomeric material having a durometer reading of about 40–60 may be used. The diameter of inset 66 is greater than the largest diameter of generally conical abutment 64. Abutment 64, with adjustable stop member 58 on which it is carried, and inset 66 together comprise a proportional travel control means interposed between the remote end of plunger 50 and the remote end of the axially extending cavity of valve 10.

Figures 3, 4, 5:
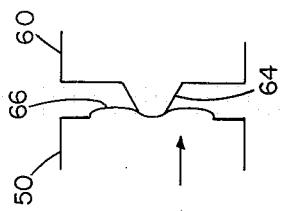
FIGS. 3, 4 and 5 are schematic showings of a portion of the valve in the closed, partly open and fully open positions, respectively.

The axial position of conical abutment 64 is determined by the position of adjustable stop member 58 within axial passage 32, which is such as to preload abutment 64 into contact with elastomeric inset 66 when the valve is closed, that is, when inset 52 is seated against valve seat 36. This condition is shown in FIG. 3.

Because abutment 64 is preloaded to bear against inset 66 in the closed condition of the valve, all motion of plunger 50 is opposed by the progressive deformation of inset 66.

Figure 7:
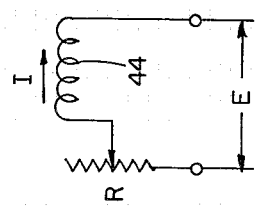
FIG. 7 is a graph showing the relation of current to valve plunger travel.
Figure 8:
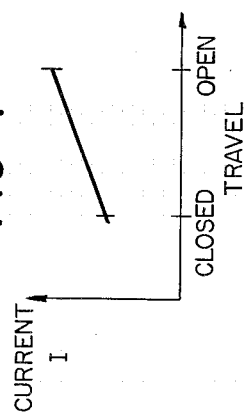
FIG. 8 is a schematic showing of the variable current supply to the valve.

When current I, supplied by a suitable voltage source E, flows in coil 44 of solenoid 16, plunger 50 is moved away from valve seat 36. This travel of plunger 50 is opposed by the pressure of conical abutment 64 against resilient elastomer inset 66, so that the plunger does not move to a fully open position. Rather, the valve is partly open (FIG. 4). As the current I is increased by varying the resistance R (FIG. 8), plunger 50 travels further away from valve seat 36, causing further deformation of inset 66, eventually reaching the fully open position (FIG. 5). The travel of plunger 50 is in proportion to the flow of current I in coil 44 (FIG. 7). The fluid flow is determined by the axial distance between inset 52 and valve seat 36. The maximum travel of plunger 50 is about 0.008 inch.

Valve 10 is about two inches in overall length, and is designed to operate within a current range of 10 milliamps to 500 milliamps, and at a fluid pressure (air pressure) of about 0 to 100 psi. Because of its small size and low power requirements, the valve is particularly suited for use in computer interface applications, such as to control fluid flow according to the output of a microprocessor or other logic circuitry. The valve is small enough to be connected to a printed circuit board rather than requiring to be separately mounted.

Figure 2:
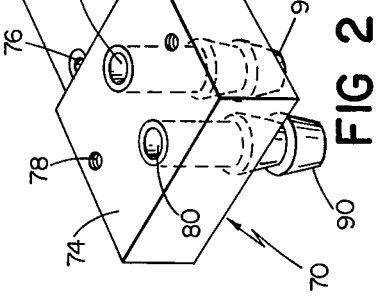
FIG. 2 is a view of the connector of the invention.

The connector 70 of the invention, shown in FIG. 2, permits the valve to be simply connected to a printed circuit board with electrical and pneumatic connections to the valve extending through the board to the further side. The connector 70 is made of suitable organic plastic material, and may be manufactured by injection molding. Connector 70 provides a flat lower surface (not visible in the drawing), and a flat upper surface 72 to accommodate electrical portion 13 of valve 10, with an adjacent slightly raised flat surface portion 74 to accommodate valve body (forward) portion 11.

Flat surface 72 provides two receptacles 76 which include electrically conductive linings and are adapted to receive the two electrical conductors 18 and 20 of valve 10. Each receptacle 76 is connected to an electrically conductive pin 77 carried on the flat lower surface of connector 70. Flat portion 74 provides two screw holes 78 which cooperate with screw holes 24 in valve forward portion 11 (FIG. 1) to permit valve 10 to be attached to connector 70. Additionally, flat surface 74 provides two fluid port receiving apertures 80, provided with O-ring seals and communicating with pneumatic barbs 90 and 92 carried on the flat lower surface of connector 70.

Connector 70, at the end remote from raised flat portion 74, provides an upright portion 82, in which is provided a recess 84. Recess 84 communicates, through an internal passage 94, with a pneumatic barb 96 carried on the flat lower surface of connector 70. When the valve of the present invention (a two port valve) is assembled to connector 70, the end 59 of adjustable stop member 58 is received in aperture 84. However, when connector 70 is assembled to a three port valve having its third port in the position of end 59 of stop member 58, the third port, fitted with an O-ring, is received in recess 84. The connector of the invention is therefore adapted for use with valves of various designs.

Figure 6:
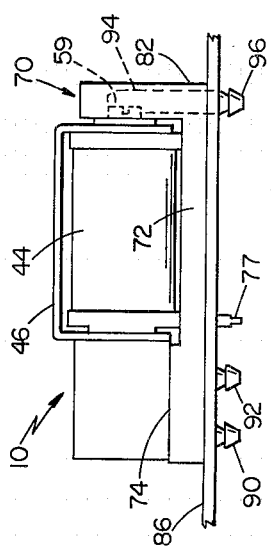
FIG. 6 shows the valve and connector connected together and to a support.

Valve 10 is assembled to connector 70 by first inserting the end 59 of adjustable stop member 58 into aperture 84, then inserting electrical connectors 18 and 20 into the two receptacles 76, and inserting fluid ports 12 and 14 into apertures 80. Screws are then inserted through screw holes 24 and 78 to secure the valve to the connector. The assembled valve 10 and connector 70 are seen in FIG. 6, in which the connector is shown assembled to a printed circuit board 86. The connector is secured to the board by soldering the pins 77. As assembled to the board, the connector and valve provide all electrical and fluid connections on the side of the board remote from the valve, where they can be connected as appropriate into electrical and fluid circuitry.

What is claimed is:

1. A solenoid controlled proportional flow valve, comprising
   an operating solenoid having an axially extending coil,
   a valve body having an axially extending cavity with a fluid inlet passage, a fluid outlet passage and a valve seat surrounding one of said passages on one end wall of said cavity,
   a valve plunger axially movable within said cavity for movement of one end wall thereof toward and away from said valve seat,
   biasing means interposed between the opposite ends of said cavity and plunger, said biasing means including an abutment preloaded in contact with a resilient deformable elastomeric spring having a dimension at all times greater than the portion of said abutment in contact therewith,
   said biasing means normally maintaining said valve plunger in contact with said valve seat and said solenoid moving said plunger away from said valve seat in proportion to the flow of current therethrough.

2. A solenoid controlled proportional flow valve, comprising
   a valve operating solenoid having a core, and an axially extending coil wound on said core, said core defining an axially extending internal passage,
   a valve portion providing a valve chamber and a fluid inlet passage and fluid outlet passage communicating with said valve chamber, and a valve seat surrounding one of said passages on one wall of said valve chamber,
   said internal passage and said valve chamber together defining an axially extending cavity,
   a valve plunger axially movable within said cavity for movement of one end wall thereof toward and away from said valve seat,
   biasing means interposed between said cavity and said plunger, said biasing means opposing the operating force of said solenoid, said biasing means comprising
   a generally conical abutment having a rounded free end preloaded in contact with a resilient deformable elastomeric spring having a diameter at all times greater than the portion of said conical abutment member in contact therewith,
   said biasing means normally maintaining said valve plunger in contact with said valve seat, said solenoid moving said plunger away from said valve seat in proportion to the flow of current therethrough.

3. A solenoid controlled proportional flow valve, comprising
   a valve-operating solenoid having a generally cylindrical axially extending core, and an axially extending coil wound on said core, said core defining an axially extending internal passage,
   a valve portion providing a valve chamber communicating with said internal passage, a fluid inlet passage and a fluid outlet passage communicating with said valve chamber, and a valve seat surrounding one of said passages on one wall of said valve chamber,
   biasing means comprising proportional travel control means and valve closure biasing means,
   said internal passage and said valve chamber together defining an axially extending cavity,
   a valve plunger axially movable within said cavity for movement of one end wall thereof toward and away from said valve seat,
   biasing means comprising proportional travel control means and valve closure biasing means,
   said valve closure biasing means comprising a spring interposed between said plunger and the wall of said valve chamber opposite said one wall, said valve closure biasing means normally maintaining said valve plunger in contact with said valve seat,
   said proportional travel control means comprising
   a resilient deformable elastomeric member carried at the end of said valve plunger remote from said valve seat,
   a generally conical abutment disposed within said axially extending internal passage and extending toward said elastomeric member, said abutment having a rounded free end, and having a greatest diameter smaller than the diameter of said elastomeric member, and adjustment means for positioning said abutment axially within said passage to preload said abutment into contact with said elastomeric member in the closed condition of said valve, whereby said plunger is moved away from said valve seat through a distance proportional to the flow of current through said solenoid.

4. A valve connector adapted for use with a valve having at least two fluid ports, the valve having an electrical portion providing two electrical connections, and a forward valving portion providing two fluid ports, said connector comprising a connector body of electrically non-conductive material, having a generally flat lower surface, said connector body comprising a forward portion having a valving portion receiving upper surface, and a median portion having an electrical portion receiving upper surface, said connector body foward portion providing two fluid port receiving apertures and two pneumatic barbs carried on said connector body lower surface, a said pneumatic barb being in communication with a said fluid port receiving aperture, said connector body median portion providing two electrical connection receiving apertures providing electrically conductive structure, and two electrical pins carried on said connector body lower surface, a said electrical connection receiving aperture conductive structure being electrically connected to a said pin, said connector body further comprising an upright portion remote from said forward portion and providing a fluid port receiving recess, an internal passage in communication therewith, and a pneumatic barb in communication with said passage carried on said connector flat lower surface.

* * * * *